(12) United States Patent
Aihara

(10) Patent No.: US 11,287,041 B2
(45) Date of Patent: Mar. 29, 2022

(54) SEALING APPARATUS

(71) Applicant: NOK CORPORATION, Tokyo (JP)

(72) Inventor: Takayuki Aihara, Fukushima (JP)

(73) Assignee: NOK CORPORATION, Tokyo (JP)

( * ) Notice: Subject to any disclaimer, the term of this patent is extended or adjusted under 35 U.S.C. 154(b) by 117 days.

(21) Appl. No.: 16/638,558

(22) PCT Filed: Aug. 10, 2018

(86) PCT No.: PCT/JP2018/030121
§ 371 (c)(1),
(2) Date: Feb. 12, 2020

(87) PCT Pub. No.: WO2019/035429
PCT Pub. Date: Feb. 21, 2019

(65) Prior Publication Data
US 2021/0148465 A1 May 20, 2021

(30) Foreign Application Priority Data
Aug. 14, 2017 (JP) .............................. JP2017-156557

(51) Int. Cl.
*F16J 15/3232* (2016.01)

(52) U.S. Cl.
CPC ................................ *F16J 15/3232* (2013.01)

(58) Field of Classification Search
CPC .... F16J 15/00; F16J 15/16; F16J 15/50; F16J 15/52; F16J 15/3232

(Continued)

(56) References Cited

U.S. PATENT DOCUMENTS 5,053,661 A * 10/1991 Kitamura ............... H02K 5/124
 310/83
5,544,895 A * 8/1996 Heine .................. F16J 15/3228
 277/562

(Continued)

FOREIGN PATENT DOCUMENTS

EP 0420212 A2 4/1991
EP 2628982 A1 8/2013

(Continued)

OTHER PUBLICATIONS

Extended European Search Report dated Mar. 19, 2021 (corresponding to EP18845864.0).

*Primary Examiner* — Nathan Cumar
(74) *Attorney, Agent, or Firm* — Harness, Dickey & Pierce, P.L.C.

(57) ABSTRACT

To provide a sealing apparatus in which a uniform amount of grease can be applied to an inner circumferential surface of both a main lip and an auxiliary lip in a circumferential direction. A sealing apparatus 10 includes: a main lip 122 which is slidable on a shaft; an auxiliary lip 221 which is provided on a sealed fluid side with respect to the main lip 122 and which is slidable on the shaft; and grease G applied to an inner circumferential surface of both the main lip 122 and the auxiliary lip 221, wherein the sealing apparatus 10 further includes an auxiliary lip-side annular projection 222 which extends from an auxiliary lip 221 side toward a main lip 122 side to a position not in contact with the main lip 122 and which prevents the grease G from entering radially outwardly.

6 Claims, 4 Drawing Sheets

(58) Field of Classification Search
USPC .......................................................... 277/562
See application file for complete search history.

(56) References Cited

U.S. PATENT DOCUMENTS 5,690,471 A * 11/1997 Sasaki ................... F04D 29/106
                                                                                                           277/353
6,102,409 A * 8/2000 Furuyama ............ F16J 15/3228
                                                                                                           277/559

FOREIGN PATENT DOCUMENTS

| JP | H03-054349 U | 5/1991 |
| JP | H07-056598 Y2 | 12/1995 |
| JP | H10-073165 A | 3/1998 |
| JP | 2005-249187 A | 9/2005 |

* cited by examiner

__SEALING APPARATUS__

CROSS-REFERENCE TO RELATED APPLICATIONS

This application is a National Stage of International Application No. PCT/JP2018/030121, filed Aug. 10, 2018 (now WO 2019/035429A1), which claims priority to Japanese Application No. 2017-156557, filed Aug. 14, 2017. The entire disclosures of each of the above applications are incorporated herein by reference.

FIELD

The present disclosure relates to a sealing apparatus for sealing an annular gap between a shaft and a housing.

BACKGROUND

Figure 4:
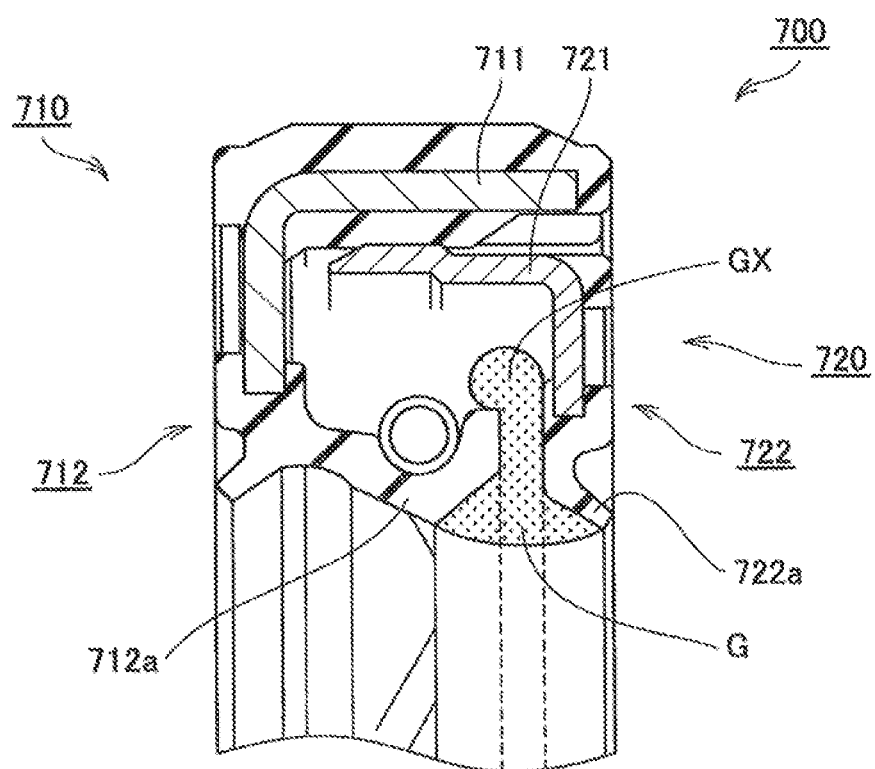

An oil seal (a sealing apparatus) used in a reduction gear or the like includes an auxiliary lip in addition to a seal lip (a main lip) in order to suppress abrasion of the seal lip due to metallic powder mixed into lubricating oil or grease. A sealing apparatus according to a conventional example will now be described with reference to FIG. 4. FIG. 4 is a schematic sectional view of a sealing apparatus according to a conventional example.

A sealing apparatus 700 according to the conventional example includes a main seal 710 and an auxiliary seal 720. The main seal 710 includes a reinforcement ring 711 and a seal main body 712 which is made of a rubber-like elastic body and which is integrally provided with the reinforcement ring 711. A main lip 712a which is slidable on a shaft is provided in the seal main body 712. The auxiliary seal 720 includes a reinforcement ring 721 and a seal main body 722 which is made of a rubber-like elastic body and which is integrally provided with the reinforcement ring 721. An auxiliary lip 722a which is slidable on the shaft is provided in the seal main body 722.

Grease G is applied to an inner circumferential surface of both the main lip 712a and the auxiliary lip 722a. A sealing apparatus to which grease G has been applied at a manufacturer who manufactures and sells the sealing apparatus is typically shipped to a manufacturer who manufactures and sells reduction gears or the like. The grease G is applied from the main lip 712a to the auxiliary lip 722a sequentially. Since an annular gap is provided between the main lip 712a and the auxiliary lip 722a, the grease G enters into the gap when the grease G is applied. In addition, since an inner side of the gap is directly communicated to a wide space, unequal amounts of the grease G enters from the gap depending on locations in a circumferential direction. For example, a large amount of the grease G may enter at a given location in the circumferential direction as denoted by GX in FIG. 4. Thus, an amount of the grease G applied to the inner circumferential surface of both the main lip 712a and the auxiliary lip 722a becomes unequal in the circumferential direction. This may cause sliding abrasion of the main lip 712a and the auxiliary lip 722a to develop at a faster rate in portions where the amount of the grease G applied is small. Thus, sealing performance of the sealing apparatus may not be kept over a long period of time.

CITATION LIST

Patent Literature

[PTL 1] Japanese Examined Utility Model Application Publication No. H7-56598

SUMMARY

Technical Problem

An object of the present disclosure is to provide a sealing apparatus in which a uniform amount of grease can be applied to an inner circumferential surface of both a main lip and an auxiliary lip in a circumferential direction.

Solution to Problem

In order to achieve the object, the present disclosure adopts the following means.

A sealing apparatus according to the present disclosure is a sealing apparatus which seals an annular gap between a shaft and a housing, the sealing apparatus including: a main lip which is slidable on the shaft; an auxiliary lip which is provided on a sealed fluid side with respect to the main lip and which is slidable on the shaft; and grease applied to an inner circumferential surface of both the main lip and the auxiliary lip, wherein the sealing apparatus further includes at least one of a main lip-side annular projection and an auxiliary lip-side annular projection, the main lip-side annular projection extending from a main lip side toward an auxiliary lip side to a position not in contact with the auxiliary lip and preventing the grease from entering radially outwardly, and the auxiliary lip-side annular projection extending from the auxiliary lip side toward the main lip side to a position not in contact with the main lip and preventing the grease from entering radially outwardly.

The sealing apparatus according to the present disclosure includes at least one of the main lip-side annular projection and the auxiliary lip-side annular projection. This at least one of the main lip-side annular projection and the auxiliary lip-side annular projection prevents the grease from entering from a gap between the main lip and the auxiliary lip when the grease is applied. This suppresses occurrence of a situation in which a large amount of grease enters in a part in the circumferential direction. This equalizes an amount of grease applied to the inner circumferential surface of both the main lip and the auxiliary lip in the circumferential direction. Because the main lip-side annular projection is not in contact with the auxiliary lip and the auxiliary lip-side annular projection is not in contact with the main lip, these annular projections do not prevent the main lip or the auxiliary lip from deforming to fit the shaft.

The main lip-side annular projection may extend parallel to a central axis of the sealing apparatus or extend so as to be reduced in diameter toward a distal end.

This enables the main lip-side annular projection to effectively prevent the grease from entering radially outwardly.

The auxiliary lip-side annular projection may extend parallel to the central axis of the sealing apparatus or extend so as to be reduced in diameter toward a distal end.

This enables the auxiliary lip-side annular projection to effectively prevent the grease from entering radially outwardly.

The auxiliary lip-side annular projection may be positioned on the radially outer side of the sealed fluid side end of the main lip.

Advantageous Effects of the Disclosure

As described above, according to the present disclosure, a uniform amount of grease can be applied to an inner circumferential surface of both a main lip and an auxiliary lip in a circumferential direction.

DRAWINGS

Figure 1:
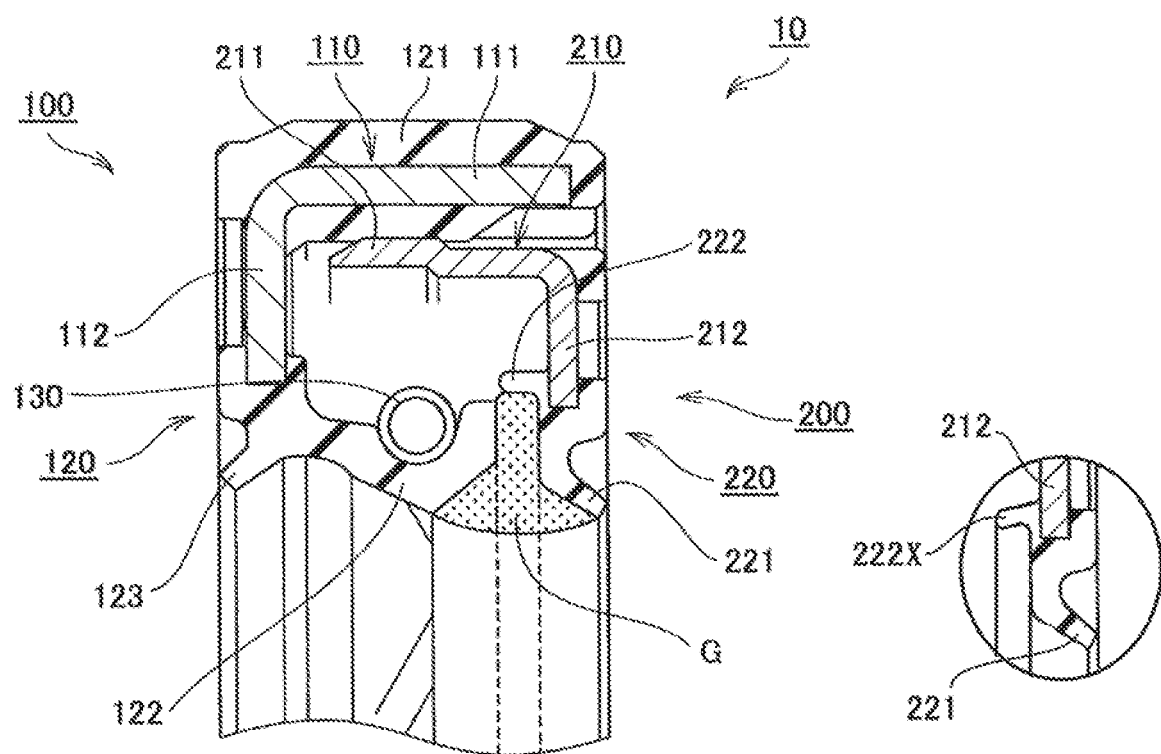
Figure 2:
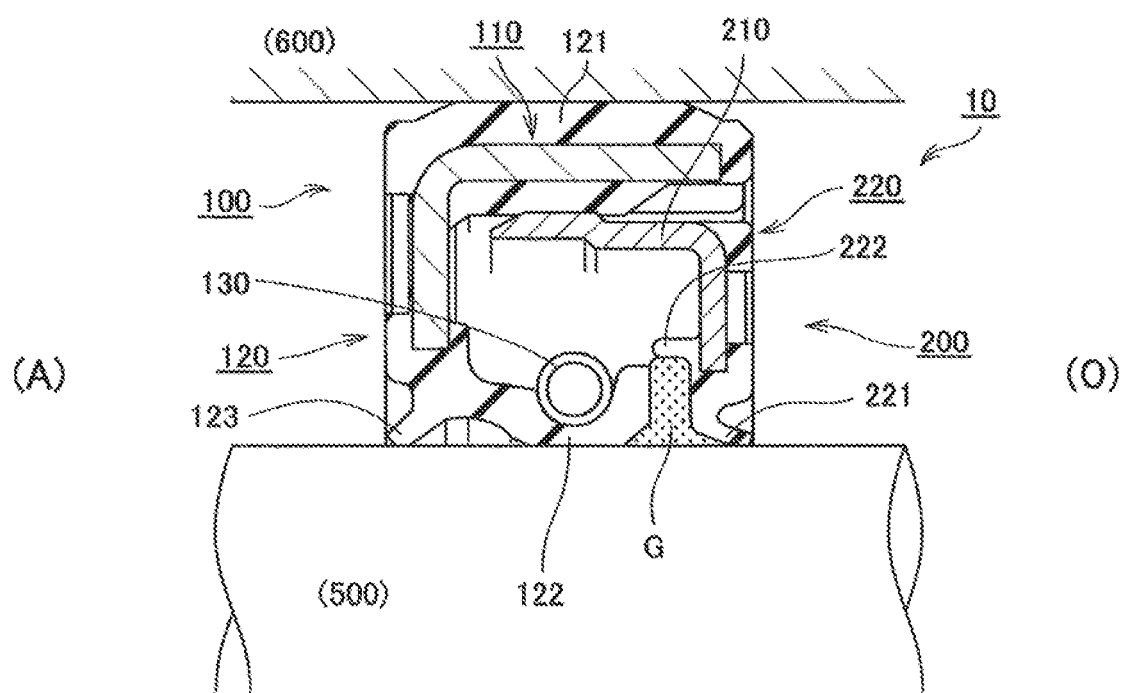
Figure 3:
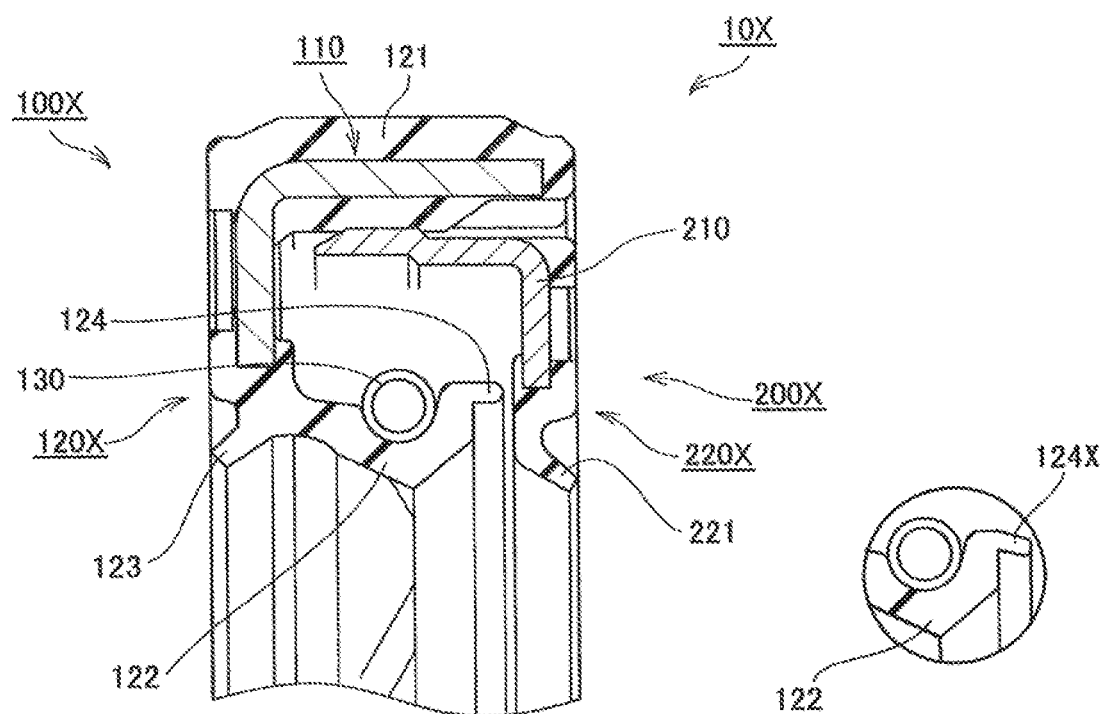

FIG. 1 is a schematic sectional view of a sealing apparatus according to a first embodiment of the present disclosure.
FIG. 2 is a schematic sectional view of a sealing structure according to the first embodiment of the present disclosure.
FIG. 3 is a schematic sectional view of a sealing apparatus according to a second embodiment of the present disclosure.
FIG. 4 is a schematic sectional view of a sealing apparatus according to a conventional example.

DETAILED DESCRIPTION

Hereinafter, modes for implementing the present disclosure will be described in detail by way of example of embodiments with reference to FIGS. 1 to 4. However, it is to be understood that dimensions, materials, shapes, relative arrangements, and the like of components described in the embodiments are not intended to limit the scope of the present disclosure thereto unless otherwise specifically noted.

First Embodiment

A sealing apparatus according to a first embodiment of the present disclosure will be described with reference to FIGS. 1 and 2. FIG. 1 is a schematic sectional view of the sealing apparatus. FIG. 2 is a schematic sectional view of a sealing structure according to the first embodiment of the present disclosure. The sealing apparatus has an approximately rotationally symmetrical shape. FIGS. 1 and 2 illustrate sectional views obtained by cutting the sealing apparatus by a plane including a central axis of the sealing apparatus.
<Sealing Structure>
The sealing structure to which the sealing apparatus (an oil seal) according to the present embodiment is applied will be described with reference to FIG. 2. The sealing apparatus can be used in a reduction gear, a servo motor, and the like in order to seal an annular gap between a shaft and a housing which rotate relative to each other. FIG. 2 illustrates an example thereof. As illustrated, a sealing apparatus 10 is configured to seal an annular gap between a shaft 500 and a shaft hole of a housing 600 which rotate relative to each other. In FIG. 2, a sealed region where a fluid to be sealed such as oil is sealed is illustrated on the right side and a region opposite to the sealed region, which is an air region in this embodiment, is illustrated on the left side. Hereinafter, for the sake of brevity, a side to be the sealed region in use, which is the right side in FIGS. 1 and 2, will be referred to as a "sealed region side (O)" and a side to be the air region in use, which is the left side in FIGS. 1 and 2, will be referred to as an "air side (A)". Note that the sealed region side (O) corresponds to the "sealed fluid side". The sealing apparatus 10 is fixed by being fitted to an inner circumferential surface of the shaft hole of the housing 600. The sealing apparatus 10 is configured to keep a stationary state relative to the housing 600 and to slide on the shaft 500 when the shaft 500 and the housing 600 rotate relative to each other.
<Sealing Apparatus>
The sealing apparatus 10 will be described in detail. The sealing apparatus 10 includes a main seal 100 and an auxiliary seal 200. The main seal 100 includes a reinforcement ring 110 and a seal main body 120 which is made of a rubber-like elastic body and which is integrally provided with the reinforcement ring 110. The main seal 100 can be obtained through insert molding of the seal main body 120 with the reinforcement ring 110 used as an insert element. The reinforcement ring 110 has a cylindrical part 111 and an inward flange part 112 provided at the air side (A) end of the cylindrical part 111. The seal main body 120 includes an outer circumferential seal part 121, a main lip 122, and a dust lip 123. The outer circumferential seal part 121 is configured to come into close contact with the inner circumferential surface of the shaft hole of the housing 600. The sealing apparatus 10 is fixed by being fitted to the inner circumferential surface of the shaft hole of the housing 600 and the fluid to be sealed is prevented from leaking from a gap between the sealing apparatus 10 and the inner circumferential surface of the shaft hole of the housing 600. The main lip 122 and the dust lip 123 are both configured to slide on an outer circumferential surface of the shaft 500. The main lip 122 is configured to prevent leakage of the fluid to be sealed. A garter spring 130 for pressing a radially inward distal end of the main lip 122 against the shaft 500 is provided on an outer circumferential surface side of the main lip 122. The dust lip 123 is configured to prevent foreign objects such as dust from entering into the sealed region side (O) from the outside.

The auxiliary seal 200 includes a reinforcement ring 210 and a seal main body 220 which is made of a rubber-like elastic body and which is integrally provided with the reinforcement ring 210. The auxiliary seal 200 can be obtained through insert molding of the seal main body 220 with the reinforcement ring 210 used as an insert element. The reinforcement ring 210 has an approximately cylindrical part 211 and an inward flange part 212 provided on the sealed region side (O) end of the approximately cylindrical part 211. The seal main body 220 includes an auxiliary lip 221 configured to slide on the shaft 500. The auxiliary seal 200 is fixed to the main seal 100 by fitting. Specifically, the approximately cylindrical part 211 of the reinforcement ring 210 in the auxiliary seal 200 is fixed by being fitted to an inside portion of the cylindrical part 111 of the reinforcement ring 110 in the seal main body 120 of the main seal 100. Thus, the auxiliary lip 221 of the auxiliary seal 200 is provided on the sealed region side (O) with respect to the main lip 122. The auxiliary lip 221 is configured to suppress penetration of the fluid to be sealed to the main lip 122 side, the fluid being able to include metallic powder or the like. The auxiliary lip 221 suppresses abrasion of the main lip 122, thus a lifespan of the main lip 122 can be extended.

The seal main body 220 of the auxiliary seal 200 includes an auxiliary lip-side annular projection 222 which extends from the auxiliary lip 221 side toward the main lip 122 side to a position not in contact with the main lip 122. The auxiliary lip-side annular projection 222 is configured to extend parallel to the central axis of the sealing apparatus 10. Note that the auxiliary lip-side annular projection may be configured to extend so as to be reduced in diameter toward a distal end, as illustrated by an auxiliary lip-side annular projection 222X in a circled portion in FIG. 1.

Grease G is applied to an inner circumferential surface of both the main lip 122 and the auxiliary lip 221 in the sealing apparatus 10. This suppresses penetration of the fluid to be sealed to the main lip 122 side and increases slidability of the main lip 122 and the shaft 500 and slidability of the auxiliary lip 221 and the shaft 500. The grease G is applied continuously from the main lip 122 to the auxiliary lip 221. The auxiliary lip-side annular projection 222 is configured to prevent the grease G from entering radially outwardly. The auxiliary lip-side annular projection 222 is positioned on the radially outer side of the sealed region side (O) end of the main lip 122. This allows an entire amount of the grease G applied to be adjusted to a desired amount.

<Advantages of Sealing Apparatus According to Present Embodiment>

Since the sealing apparatus 10 includes the auxiliary lip-side annular projection 222 in the seal main body 220 of the auxiliary seal 200, the auxiliary lip-side annular projection 222 prevents the grease G from entering through the gap between the main lip 122 and the auxiliary lip 221 when the grease G is applied. This suppresses occurrence of a situation in which a large amount of the grease G enters in a part in a circumferential direction. Thus, an amount of grease G applied to the inner circumferential surface of both the main lip 122 and the auxiliary lip 221 can be made uniform in the circumferential direction. In addition, dispersal of the grease G due to centrifugal force acting on the grease G when the shaft 500 rotates can be suppressed by the auxiliary lip-side annular projection 222.

Since the auxiliary lip-side annular projection 222 is not in contact with the main lip 122, the auxiliary lip-side annular projection 222 does not prevent the main lip 122 from deforming to fit the shaft 500 when, for example, the shaft 500 becomes eccentric with respect to the housing 600.

In addition, since the auxiliary lip-side annular projection is configured to extend parallel to a central axis of the sealing apparatus 10 (the auxiliary lip-side annular projection 222) or to extend so as to be reduced in diameter toward a distal end (the auxiliary lip-side annular projection 222X), the auxiliary lip-side annular projection 222 or 222X effectively prevents the grease G from entering radially outwardly. The auxiliary lip-side annular projection (the auxiliary lip-side annular projection 222X) configured to extend so as to be reduced in diameter toward the distal end can more effectively prevent the grease G from entering radially outwardly than the auxiliary lip-side annular projection (the auxiliary lip-side annular projection 222) configured so as to extend parallel to the central axis.

Second Embodiment

FIG. 3 shows a second embodiment of the present disclosure. A main lip-side annular projection is provided to a seal main body of a main seal in the present embodiment while the auxiliary lip-side annular projection is provided to the seal main body of the auxiliary seal in the first embodiment. Since other configurations and effects are the same as those of the first embodiment, the same components will be denoted by the same reference characters and a description thereof will be omitted when appropriate.

FIG. 3 is a schematic sectional view of a sealing apparatus according to the second embodiment of the present disclosure. The sealing apparatus has an approximately rotationally symmetrical shape. FIG. 3 shows a sectional view obtained by cutting the sealing apparatus at a plane including a central axis of the sealing apparatus. FIG. 3 shows a state where the grease G has not been applied yet.

A description of a sealing structure to which the sealing apparatus according to the present embodiment is applied will be omitted because it is similar to the sealing structure described in the first embodiment. A sealing apparatus 10X according to the present embodiment has a main seal 100X and an auxiliary seal 200X. The main seal 100X has a reinforcement ring 110 and a seal main body 120X which is made of a rubber-like elastic body and which is integrally provided with the reinforcement ring 110. A description of the reinforcement ring 110 will be omitted because its configuration is same as that of the first embodiment.

The seal main body 120X in the main seal 100X has an outer circumferential seal part 121, a main lip 122, and a dust lip 123. A description of the outer circumferential seal part 121, the main lip 122, and the dust lip 123 will be omitted because their configurations are same as those of the first embodiment. The seal main body 120X has a main lip-side annular projection 124 which extends from the main lip 122 side toward the auxiliary lip 221 side to a position not in contact with the auxiliary lip 221, which is different from the first embodiment. The main lip-side annular projection 124 is configured so as to extend parallel to a central axis of the sealing apparatus 10X. Note that the main lip-side annular projection may be configured to extend so as to be reduced in diameter toward a distal end as illustrated by a main lip-side annular projection 124X in a circled portion in FIG. 3.

The auxiliary seal 200X has a reinforcement ring 210 and a seal main body 220X which is made of a rubber-like elastic body and which is integrally provided with the reinforcement ring 210. The reinforcement ring 210 is configured similarly to that of the first embodiment. The seal main body 220X according to the present embodiment is different from the seal main body 220 according to the first embodiment in that the seal main body 220X does not have the auxiliary lip-side annular projection 222 provided to the seal main body 220.

Grease G is applied to an inner circumferential surface of both the main lip 122 and the auxiliary lip 221 in the sealing apparatus 10X. Note that FIG. 3 shows a state where the grease G has not been applied. The grease G is applied similarly to the first embodiment as described with reference to FIGS. 1 and 2. The main lip-side annular projection 124 is configured to prevent the grease G from entering radially outwardly.

Since the sealing apparatus 10X has the main lip-side annular projection 124 in the seal main body 120X of the main seal 100X, the main lip-side annular projection 124 prevents the grease G from entering through the gap between the main lip 122 and the auxiliary lip 221 when the grease G is applied. This suppresses occurrence of a situation in which a large amount of the grease G enters in a part in the circumferential direction. Thus, an amount of grease G applied to the inner circumferential surface of both the main lip 122 and the auxiliary lip 221 can be made uniform in the circumferential direction. In addition, dispersal of the grease G due to centrifugal force acting on the grease G when the shaft 500 rotates can be suppressed by the main lip-side annular projection 124.

Since the main lip-side annular projection 124 is not in contact with the auxiliary lip 221, the main lip-side annular projection 124 does not prevent the auxiliary lip 221 from deforming to fit the shaft 500 when, for example, the shaft 500 becomes eccentric with respect to the housing 600.

In addition, since the main lip-side annular projection is configured to extend parallel to a central axis of the sealing apparatus 10 (the main lip-side annular projection 124) or to extend so as to be reduced in diameter toward a distal end (the main lip-side annular projection 124X), the main lip-side annular projection 124 or 124X effectively prevents the grease G from entering radially outwardly. The main lip-side annular projection (the main lip-side annular projection 124X) configured to extend so as to be reduced in diameter toward the distal end can more effectively prevent the grease G from entering radially outwardly than the main lip-side annular projection (the main lip-side annular projection 124) configured so as to extend parallel to the central axis.

(Other)

Although the first embodiment describes a configuration having an auxiliary lip-side annular projection and the second embodiment describes a configuration having a main lip-side annular projection, a configuration having both an auxiliary lip-side annular projection and a main lip-side annular projection may be adopted. In this case, the auxiliary lip-side annular projection and the main lip-side annular projection may be arranged so as not to come into contact with each other. A sealing apparatus obtained by fixing the auxiliary seal 200 described in the first embodiment to the main seal 100X described in the second embodiment by fitting and applying the grease G.

REFERENCE SIGNS LIST

10, 10X Sealing apparatus
100, 100X Main seal
110 Reinforcement ring
111 Cylindrical part
112 Inward flange part
120, 120X Seal main body
121 Outer circumferential seal part
122 Main lip
123 Dust lip
124 Main lip-side annular projection
130 Garter spring
200, 200X Auxiliary seal
210 Reinforcement ring
211 Approximately cylindrical part
212 Inward flange part
220, 220X Seal main body
221 Auxiliary lip
222 Auxiliary lip-side annular projection
500 Shaft
600 Housing
G Grease

The invention claimed is:

1. A sealing apparatus which is configured to seal an annular gap between a shaft and a housing, the sealing apparatus comprising:
   a main lip which is slidable on the shaft;
   an auxiliary lip which is provided on a sealed fluid side with respect to the main lip and which is slidable on the shaft;
   a garter spring provided on an outer circumferential surface side of the main lip and configured to press a radially inward distal end of the main lip against the shaft; and
   grease applied between the main lip and the auxiliary lip, wherein
   the sealing apparatus further comprises
   an auxiliary lip-side annular projection extending from the auxiliary lip side toward the main lip side to a position not in contact with the main lip and preventing the grease from entering radially outwardly.

2. The sealing apparatus according to claim 1, wherein the auxiliary lip-side annular projection extends parallel to a central axis of the sealing apparatus or extends so as to be reduced in diameter toward a distal end.

3. The sealing apparatus according to claim 2, wherein the auxiliary lip-side annular projection is positioned on the radially outer side of the sealed fluid side end of the main lip.

4. The sealing apparatus according to claim 1, wherein the auxiliary lip-side annular projection is positioned on the radially outer side of the sealed fluid side end of the main lip.

5. A sealing apparatus which is configured to seal an annular gap between a shaft and a housing, the sealing apparatus comprising:
   a main lip which is slidable on the shaft;
   an auxiliary lip which is provided on a sealed fluid side with respect to the main lip and which is slidable on the shaft; and
   grease applied between the main lip and the auxiliary lip, wherein
   the sealing apparatus further comprises
   a main lip-side annular projection being spaced radially outward from the shaft, extending from a main lip side toward an auxiliary lip side to a position not in contact with the auxiliary lip and preventing the grease from entering radially outwardly.

6. The sealing apparatus according to claim 5, wherein the main lip-side annular projection extends parallel to a central axis of the sealing apparatus or extends so as to be reduced in diameter toward a distal end.

* * * * *